US011998857B2

(12) United States Patent
Braun

(10) Patent No.: US 11,998,857 B2
(45) Date of Patent: Jun. 4, 2024

(54) SYSTEM AND METHOD FOR PRE-POSITIONING EQUIPMENT USING PORTABLE AC POWER SUPPLY

(71) Applicant: Eric Braun, Las Vegas, NV (US)

(72) Inventor: Eric Braun, Las Vegas, NV (US)

( * ) Notice: Subject to any disclaimer, the term of this patent is extended or adjusted under 35 U.S.C. 154(b) by 679 days.

(21) Appl. No.: 17/172,608

(22) Filed: Feb. 10, 2021

(65) Prior Publication Data

US 2021/0252420 A1 Aug. 19, 2021

Related U.S. Application Data

(60) Provisional application No. 62/975,941, filed on Feb. 13, 2020.

(51) Int. Cl.

| | |
|---|---|
| ***A63J 1/02*** | (2006.01) |
| ***B66D 3/20*** | (2006.01) |
| ***B66D 3/26*** | (2006.01) |
| *B66D 1/26* | (2006.01) |

(52) U.S. Cl.
CPC ................ *A63J 1/028* (2013.01); *B66D 3/20* (2013.01); *B66D 3/26* (2013.01)

(58) Field of Classification Search
CPC ...... A63J 1/00; A63J 1/02; B66D 3/20; B66D 3/26; B66D 1/28
USPC ...................................................... 472/75-80
See application file for complete search history.

(56) References Cited

U.S. PATENT DOCUMENTS

| | | | | |
|---|---|---|---|---|
| 6,326,764 | B1 | 12/2001 | Virtudes | |
| 2011/0042634 | A1* | 2/2011 | Boychuk | B66D 1/12 254/362 |
| 2011/0109101 | A1 | 5/2011 | Whitney et al. | |
| 2017/0306588 | A1 | 10/2017 | Bystedt | |

OTHER PUBLICATIONS

ArkPak 730 Portable Power Source: product listing—retrieved Jan. 16, 2019 from https://www.amazon.com/ArkPak-730-Portable-Power-Source/dp/B014K6RRK0.
https://www.solaredge.com/us/products/pv-inverter/three-phase#/ retrieved Jan. 16, 2019.
Hitachi publication AN091802-1 Rev A, published Jun. 2011.
Publication CZ.0.DBH.250 retrieved from https://www.deltahoist.com/en/hoistingequipment/hoists/battery-hoists/10146-delta-battery-chain-hoists Jan. 16, 2019.

* cited by examiner

*Primary Examiner* — Kien T Nguyen
(74) *Attorney, Agent, or Firm* — DICKINSON WRIGHT PLLC

(57) ABSTRACT

A system for positioning equipment comprises a hoist including an electric motor coupled to a pulley for exerting a pulling force upon a tension member that extends to a distal end configured to attach to an elevated structure. The system also comprises a portable power supply including a battery supplying DC power, and an inverter configured to generate and supply AC power to the hoist for driving the electric motor and thereby lifting the hoist toward the elevated structure. A method for pre-positioning a hoist comprises attaching a tension member of a hoist to an elevated structure; generating AC power from a DC source by an inverter of a portable power supply; and lifting the hoist using the portable power supply. Thus, the hoist can be pre-positioned in an elevated location before utility power is available.

20 Claims, 4 Drawing Sheets

SYSTEM AND METHOD FOR PRE-POSITIONING EQUIPMENT USING PORTABLE AC POWER SUPPLY

CROSS-REFERENCE TO RELATED APPLICATIONS

This Utility Patent application claims the benefit of U.S. Provisional Patent Application Ser. No. 62/975,941 filed on Feb. 13, 2020, and titled "System and Method for Pre-Positioning Equipment using Portable AC Power Supply", the entire disclosure of which is hereby incorporated by reference.

FIELD

The present disclosure relates generally to a portable power supply and a method for using such a portable power supply to pre-position equipment where utility power is not yet available.

BACKGROUND

Power electric chain hoists are used in a number of industries for lifting structures and equipment. The entertainment industry, in particular, uses power electric chain hoists for lifting and positioning rigging, such as trusses, lighting equipment, loudspeakers, and other equipment. Traditionally, power electric chain hoists require utility electric power to be energized in the vicinity of the hoists before they can be positioned.

Stage production setup requires close coordination between different tasks that are often being performed by different tradespersons in close proximity and within tight timelines. For example, construction of staging structure, running of utility electrical power, installation of rigging (including positioning of chain hoists), construction of rigging and other structures, such as sets, etc. Some tasks in the production setup, such as positioning and use of chain hoists for rigging can only be perform after utility power is run and energized in the vicinity of those chain hoists. This reliance on installed and energized electrical power can present a bottleneck that must be accounted for in coordinating the production setup process.

SUMMARY

The present disclosure provides a system for positioning equipment. The system comprises a hoist including an electric motor coupled to a pulley for exerting a pulling force upon a tension member, the tension member extending from the hoist to a distal end that is configured to attach to an elevated structure. The system also comprises a portable power supply including a battery supplying DC power, and an inverter configured to generate AC power using the DC power from the battery. The portable power supply is configured to supply the AC power to the hoist for driving the electric motor and thereby lifting the hoist toward the elevated structure.

The present disclosure also provides a method for positioning equipment. The method comprises: attaching a distal end of a tension member of a hoist to an elevated structure; generating AC power from a DC source by an inverter of a portable power supply; driving a motor of the hoist using the AC power from the portable power supply; lifting the hoist toward the elevated structure using the portable power supply; disconnecting the portable power supply from the hoist after the hoist is lifted to a prepositioned location; connecting the hoist to a utility AC power source after the hoist is in the prepositioned location; and lifting a load by the hoist using the utility AC power supply.

BRIEF DESCRIPTION OF THE DRAWINGS

Further details, features and advantages of designs of the invention result from the following description of embodiment examples in reference to the associated drawings.

DETAILED DESCRIPTION

Figure 1:
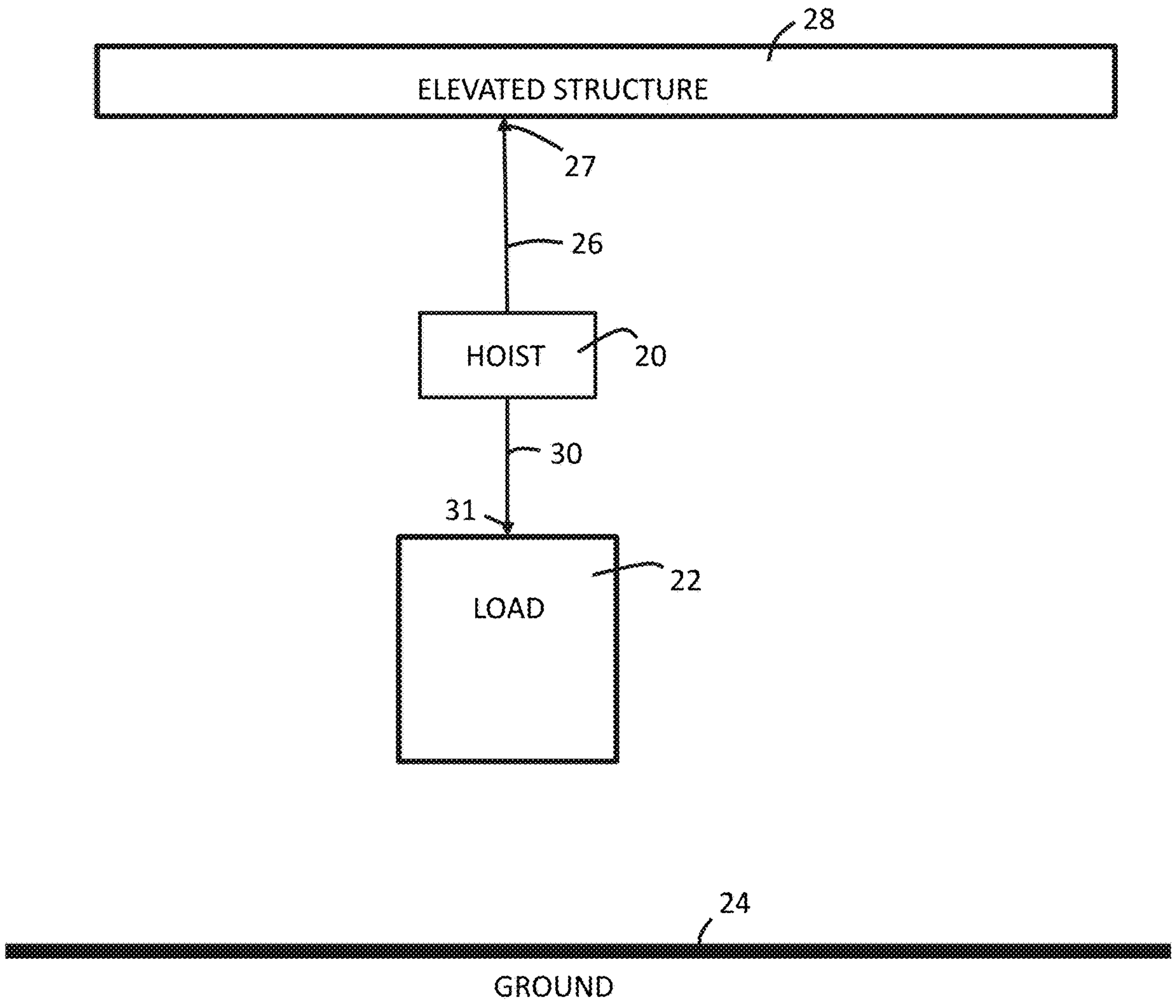
FIG. 1 shows a block diagram of a hoist used to lift a load in a conventional arrangement.

Referring to the drawings, the present invention will be described in detail in view of following embodiments.

FIG. 1 is a block diagram showing a conventional configuration for a hoist 20 to lift and to hold a load 22 in an elevated position above a ground surface 24. The hoist 20 includes an upper tension member 26 extending to an upper distal end 27 that is fixed to an elevated structure 28, such as a structural beam or truss. The upper tension member 26 may include one or more cables, straps, and/or chains. One or more rigging devices such as slings, hooks, blocks, shackles, etc. may be connected to the upper distal end 27 for coupling the upper tension member 26 to the elevated structure 28. The 20 also includes a lower tension member 30 extending to a lower distal end 31 that is fixed to the load 22. The tension member 30 may include one or more cables, straps, and/or chains. One or more rigging devices such as slings, hooks, blocks, shackles, etc. may be connected to the lower distal end 31 for coupling the lower tension member 30 to the load 22. In operation, the hoist 20 is configured to adjust the length of one or both of the upper tension member 26 and/or the lower tension member 30 to selectively raise or lower the load 22, thus providing for the load 22 to be placed in an elevated location above the ground surface 24. For example, the hoist 20 may be a chain hoist that is configured to pull a chain of the upper tension member 26, thus raising the load 22 together with the hoist 20.

Figure 2:
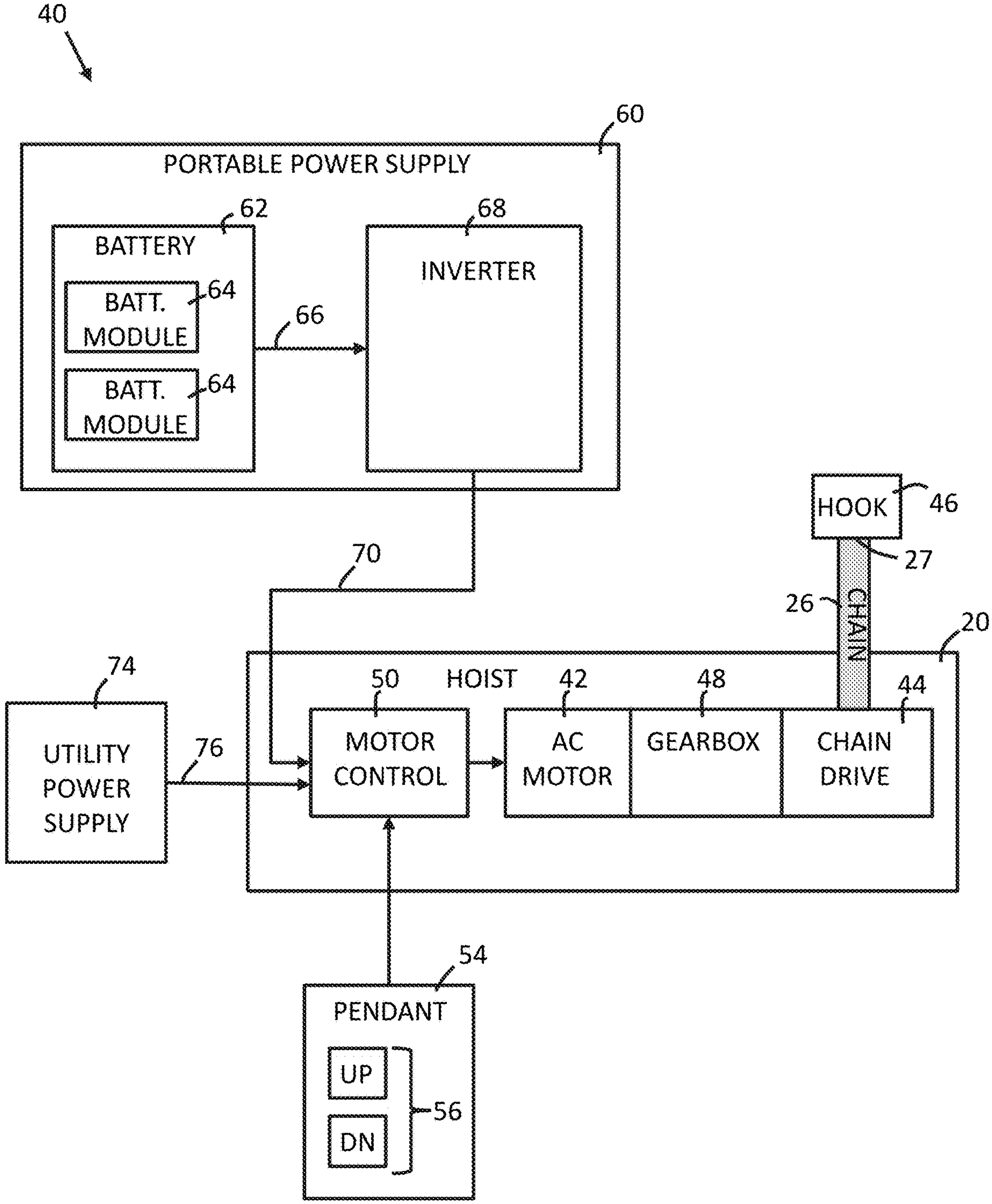
FIG. 2 shows a block diagram of a system for positioning equipment in accordance with some embodiments of the present disclosure.

FIG. 2 shows a block diagram of a system 40 for positioning equipment in accordance with some embodiments of the present disclosure. Specifically, FIG. 2 shows the hoist 20 that includes an electric motor 42 coupled to a pulley 44 for exerting a pulling force upon a tension member 26. More specifically, the hoist 20 shown in FIG. 2 is a chain hoist in which the tension member 26 is a chain and the pulley 44 is a chain drive configured to exert the pulling force upon the chain. However, other types of hoists 20 with other types of tension members 26 may be used in the system 40 of the present disclosure. The tension member 26 may include, for example, a cable, a rope, a strap, etc. The electric motor 42 is an alternating current (AC) motor that is configured to be driven by an AC electrical power. The electric motor 42 may be a single-phase AC motor or a multi-phase motor, such as a three-phase AC motor.

The tension member 26 extends from the hoist 20 to a distal end 27 that is configured to attach to an elevated structure 28 (as shown, for example, in FIG. 1). A hook 46 is attached to the distal end 27 of the chain 26 to aid in coupling the distal end 27 to the elevated structure 28. A gearbox 48 couples the electric motor 42 to the pulley 44 for reducing the speed of the pulley and increasing torque. The hoist 20 also includes a motor controller 50 configured to selectively apply power to the electric motor 42 and for controlling a direction of operation, either lifting (up) or lowering (down) by causing the motor 42 to turn the pulley 44 in a corresponding direction.

In the example system 40 shown in FIG. 2, a pendant 54 is coupled to the motor controller 54 for a user to manually command the hoist 20 to actuate in either the lifting or lowering direction. Specifically, the pendant 54 includes control input buttons 56, labeled UP and DN for manual control of the hoist 20. The control input buttons 56 may take any form such as, for example, physical buttons and/or toggle switches or virtual buttons on a graphical user interface.

As shown in FIG. 2, the system 40 also includes a portable power supply 60 configured to AC power to the hoist 20. Specifically, the portable power supply 60 includes a battery having one or more battery modules 64 and which supplies DC power upon a DC bus 66. In some embodiments, the battery modules 64 may each be 12V modules, which may be, for example, conventional 12V batteries, such as deep cycle batteries available commercially. The battery 62 may comprise two or more of the 12V battery modules 64 which may be connected in any combination of parallel and/or series to provide the DC power upon the DC bus 66 with a voltage as an integer multiple of 12V. For example, the battery 62 may be configured to supply the DC power having a voltage as 24 VDC, 36 VDC, or 48 VDC. However, other DC voltages may be supplied.

The portable power supply 60 also includes an inverter 68 configured to generate AC power using the DC power from the battery. More specifically, the inverter 68 includes one or more electronic switches, such as switching transistors, to transform a DC electrical power from the DC bus 66 to an AC power upon a first AC conductor 70. The AC power may be a single-phase electrical power or a three-phase electrical power. In some embodiments, the AC power may have a phase-to-phase voltage of 240 VAC or 480 VAC. In some embodiments, the AC power may have a phase-to-neutral voltage of 208, 240, or 277 VAC. However, other AC voltages may be used.

The portable power supply 60 may be configured to be carried, carted, or otherwise manually transported by one or more people. The portable power supply 60 may include one or more handles and/or wheels to facilitate movement. The portable power supply 60 may be attached to or integrally constructed with a cart, dolly, wagon, trailer, or other conveyance.

In operation, the first AC conductor 70 is connected to the hoist 20, and the portable power supply 60 is configured to supply the AC power to the hoist 20 for driving the electric motor 42 and thereby lifting the hoist 20 toward the elevated structure 28.

As also shown in FIG. 2, the system 40 may also include a utility power supply 74, such as a drop from a building electrical panel that is supplied by the electrical grid. The utility power supply 74 may be coupled to supply AC power to the hoist 20 via a second AC conductor. In operation, only one of the first AC conductor 70 or the second AC conductor 76 should be coupled to the hoist 20 at any given time to prevent the portable power supply 60 from back-feeding power to the utility power supply. This may be accomplished by physically connecting only one of the first AC conductor 70 or the second AC conductor 76 to the hoist 20 at any given time. This may be accomplished by other means such as, for example, a transfer switch (not shown).

In some embodiments, the portable power supply 60 may be configured to control the hoist 20. For example, the portable power supply 60 may include control input buttons 56 for controlling Up and Down movement of the hoist 20. The control input buttons 56 on the portable power supply 60 may be similar or identical to those on a pendant 54. Additionally or alternatively, the portable power supply 60 may be configured to convey control signals from a pendant 54 to the hoist 20, with the pendant 54 connected to the portable power supply 60.

Figure 3:
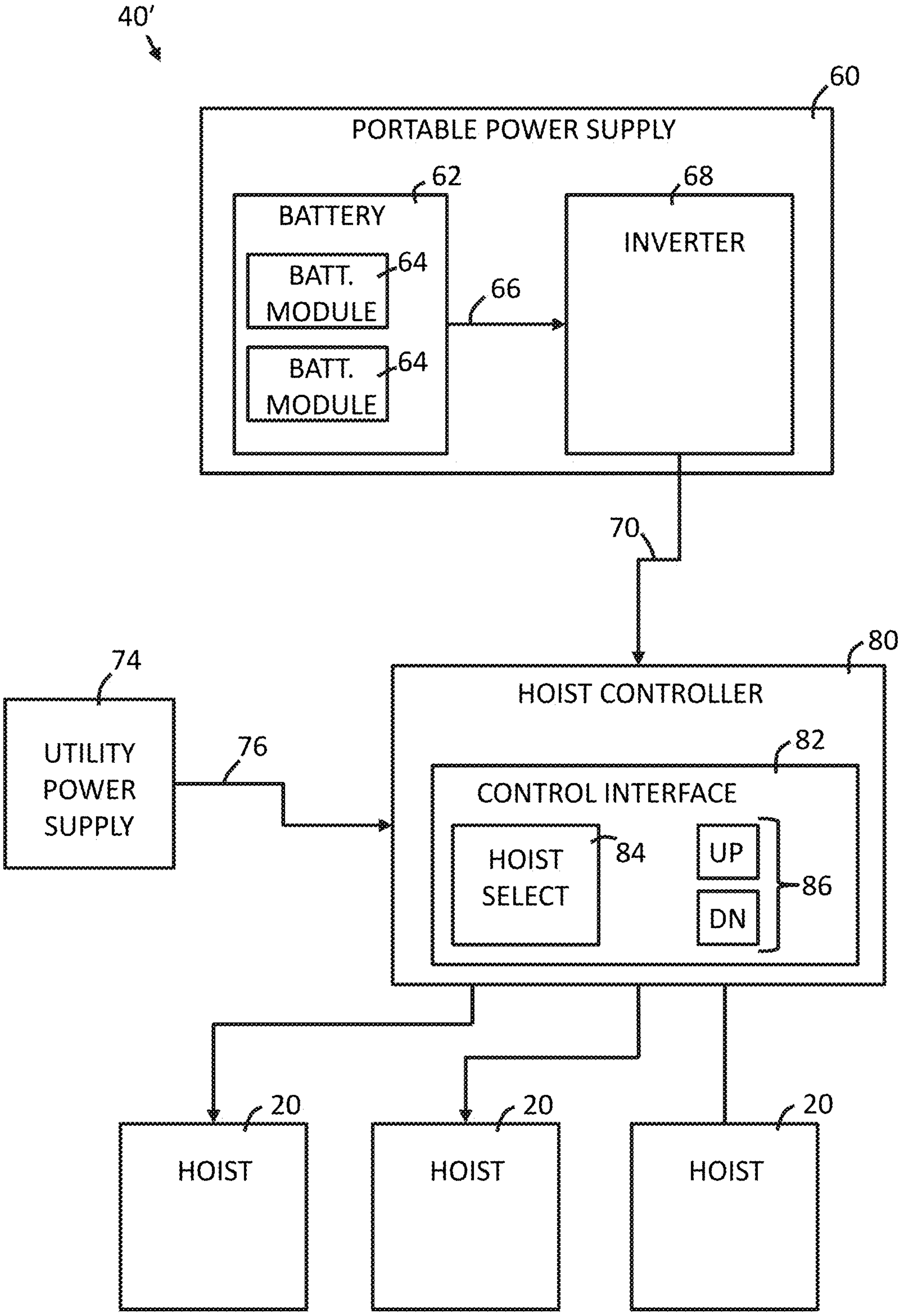
FIG. 3 shows a block diagram of a system for positioning equipment in accordance with some embodiments of the present disclosure.

FIG. 3 shows a block diagram of a second system 40' for positioning equipment in accordance with some embodiments of the present disclosure. The second system 40' is similar to the system 40 shown in FIG. 2, except with the addition of a host controller 80 that is configured to control and to supply power to two or more hoists 20. FIG. 3 shows an example configuration with the hoist controller 80 connected to three hoists 20, but the hoist controller 80 may be configured to control any number of one or more of the hoists 20. As shown in FIG. 3, the hoist controller 80 may include a control interface 82 having a selector interface 84 for selecting one or more of the hoists 20 to be moved, and action inputs 86, such as UP, and DN buttons for causing the selected ones of the hoists to move together. The control interface 80 may include any combination of physical devices, such as buttons and/or toggle switches, and/or virtual devices, such as buttons on a graphical user interface.

As shown in FIG. 3, the hoist controller 80 may be configured as an intermediary between the power supply (either the portable power supply 60 or the utility power supply 74), and one or more hoists 20. In other words, the portable power supply 60 may be configured to supply the AC power to the hoist 20 via the hoist controller 80.

Figure 4:
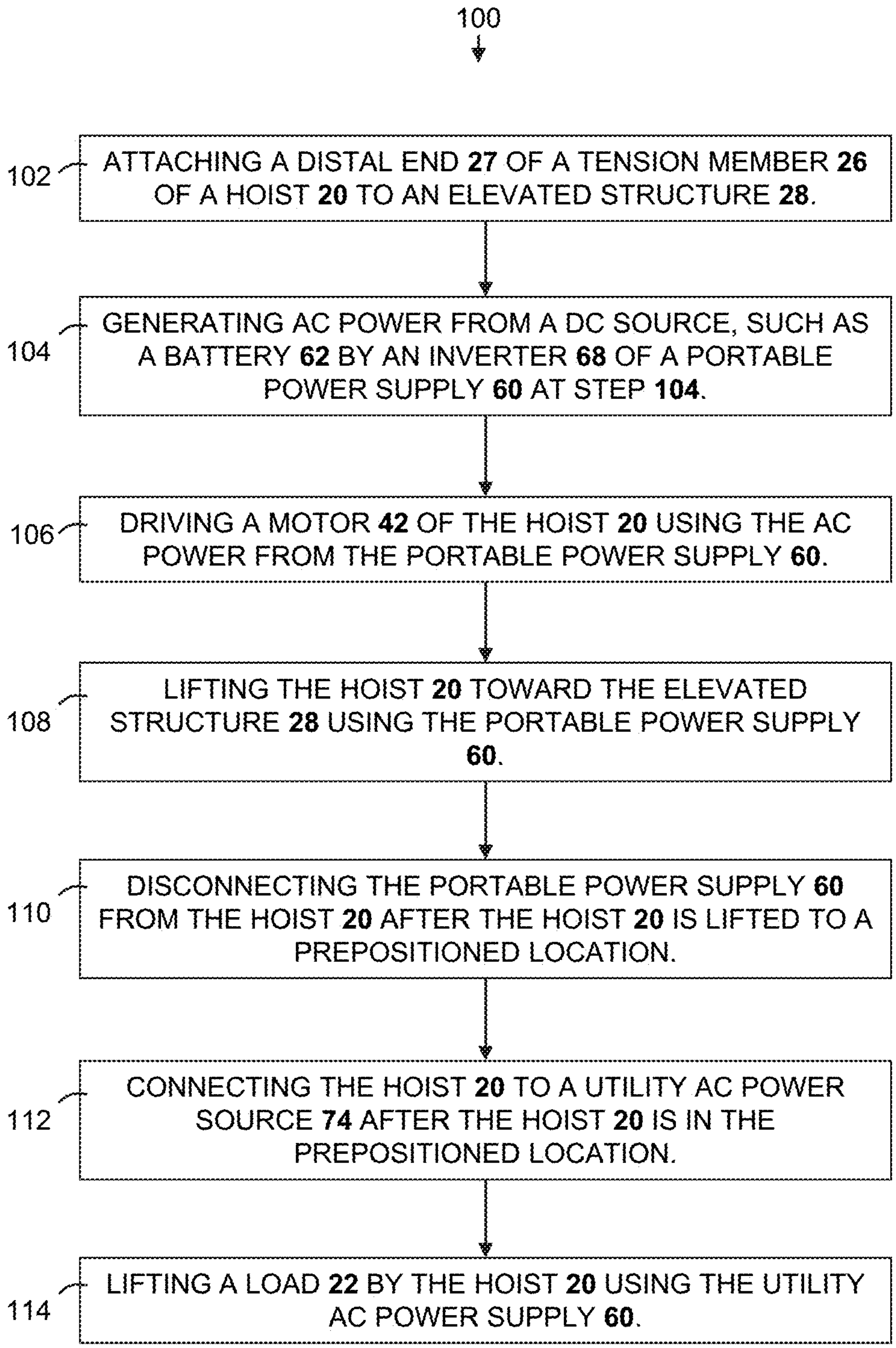
FIG. 4 shows a flow chart of steps in a method for positioning equipment in accordance with some embodiments of the present disclosure.

A method 100 for positioning equipment is shown in the flow chart of FIG. 4. The method 100 includes attaching a distal end 27 of a tension member 26 of a hoist 20 to an elevated structure 28 at step 102. This step 102 may be performed by conventional means, using conventional rigging hardware. This step 102 may be performed without any utility power available, for example, by extending the upper tension member 26 from a hoist. The extending may be performed manually or by powered means using the portable power supply 60.

The method 100 also includes generating AC power from a DC source, such as a battery 62 by an inverter 68 of a portable power supply 60 at step 104. The AC power may have any AC voltage within an operational range of the hoist 20. The AC power may be single-phase or three-phase, and the AC power may be sufficiently powerful to drive electric motors 42 of one or more hoists 42 for long enough as is necessary to preposition the hoists in elevated locations.

The method 100 also includes driving a motor 42 of the hoist 20 using the AC power from the portable power supply 60 at step 106. This driving may be performed by a user command using, for example, a pendant 54 or a hoist controller 80.

The method 100 also includes lifting the hoist 20 toward the elevated structure 28 using the portable power supply 60 at step 108. In this way, the hoist 20 may be pre-positioned in an elevated location before utility power is available in the area, thus leaving the area below open and clear for other activities, such as moving materials, construction, and/or setup.

The method 100 also includes disconnecting the portable power supply 60 from the hoist 20 after the hoist 20 is lifted to a prepositioned location at step 110. In other words, the portable power supply 60 may be used as a temporary power source, which may be used to pre-position any number of hoists 20.

The method 100 also includes connecting the hoist 20 to a utility AC power source 74 after the hoist 20 is in the prepositioned location at step 112. The utility AC power source may include an energized receptacle and/or a hard-wired connection between the hoist 20 and a source such as a breaker panel or a power distribution panel. This step 112, may be performed after, or as part of a conventional electrical setup procedure.

The method 100 also includes lifting a load 22 by the hoist 20 using the utility AC power supply 60 at step 114. This step 114 may include lowering the hoist 20 from its elevated prepositioned location, connecting the hoist 20 to the load 22, and then lifting the load 22. Some or all portions of this step 114 may be performed by conventional means. For example, the hoist 20 may be connected to the load 22 using conventional rigging, and lifting the load 22 may be performed by the hoist 20 as controlled using a pendant 54 or a hoist controller 80.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for positioning equipment, the system comprising:

a hoist including an electric motor coupled to a pulley for exerting a pulling force upon a tension member, the tension member extending from the hoist to a distal end that is configured to attach to an elevated structure;

a portable power supply including a battery supplying DC power and an inverter configured to generate AC power using the DC power from the battery;

wherein the portable power supply is configured to supply the AC power to the hoist via a first AC conductor for driving the electric motor and thereby lifting the hoist toward the elevated structure; and wherein the hoist is further configured to be connected to a utility power supply via a second AC conductor for driving the electric motor and thereby lifting the hoist toward the elevated structure.

2. The system of claim 1, wherein the AC power is a three-phase electrical power.

3. The system of claim 1, wherein the AC power has a phase-to-neutral voltage of 208 VAC or 240 VAC.

4. The system of claim 1, wherein the AC power has a phase-to-neutral voltage of 277 VAC.

5. The system of claim 1, wherein the battery comprises two or more 12V modules.

6. The system of claim 1, wherein the battery is configured to supply the DC power having a voltage as an integer multiple of 12V.

7. The system of claim 6, wherein the battery is configured to supply the DC power having a voltage as 24 VDC, 36 VDC, or 48 VDC.

8. The system of claim 1, further comprising a hoist controller; and wherein the portable power supply is configured to supply the AC power to the hoist via the hoist controller.

9. A method for positioning equipment, the method comprising:

attaching a distal end of a tension member of a hoist to an elevated structure;

generating AC power from a DC source by an inverter of a portable power supply;

conducting the AC power from the portable power supply to the hoist via a first AC conductor;

driving a motor of the hoist using the AC power from the portable power supply; and lifting the hoist toward the elevated structure using the portable power supply, wherein the hoist is further configured to be connected to a utility power supply via a second AC conductor for driving the motor and thereby lifting the hoist toward the elevated structure.

10. The method of claim 9, further comprising:

decoupling the portable power supply from the hoist; and connecting a utility AC power supply to the hoist;

lowering the hoist away from the elevated structure using the utility AC power supply;

attaching a load to the hoist; and lifting the hoist and the load toward the elevated structure using the utility AC power supply.

11. The method of claim 9, wherein the AC power source is configured to provide the AC power as a 3-phase power.

12. The method of claim 11, wherein the 3-phase power has a phase-to-neutral voltage of 208, 240, or 277 VAC.

13. The method of claim 9, wherein the DC source includes a battery configured to supply the inverter with DC power having a voltage as an integer multiple of 12 V.

14. The method of claim 13, wherein the battery is configured to supply the DC power having a voltage of 12, 24, 36, or 48 VDC.

15. The method of claim 9, wherein driving the motor of the hoist using the AC power from the portable power supply includes supplying the AC power from the portable power supply to a hoist controller and selectively transmitting the AC power from the hoist controller to the hoist.

16. A method for positioning equipment, the method comprising:

attaching a distal end of a tension member of a hoist to an elevated structure;

generating AC power from a DC source by an inverter of a portable power supply;

driving a motor of the hoist using the AC power from the portable power supply;

lifting the hoist toward the elevated structure using the portable power supply;

disconnecting the portable power supply from the hoist after the hoist is lifted to a prepositioned location;

connecting the hoist to a utility AC power source after the hoist is in the prepositioned location; and lifting a load by the hoist using the utility AC power supply.

17. The method of claim 16, wherein the AC power source is configured to provide the AC power as a 3-phase power.

18. The method of claim 17, wherein the 3-phase power has a phase-to-neutral voltage of 208, 240, or 277 VAC.

19. The method of claim 16, wherein the DC source includes a battery configured to supply the inverter with DC power having a voltage as an integer multiple of 12 V.

20. The system of claim 16, wherein driving the motor of the hoist using the AC power from the portable power supply includes supplying the AC power from the portable power supply to a hoist controller and selectively transmitting the AC power from the hoist controller to the hoist.

* * * * *